April 9, 1940. C. E. JOHNSON ET AL 2,196,605
VARIABLE SPEED DEVICE HAVING TWO MOVABLE FLANGES
Filed July 9, 1935    4 Sheets-Sheet 1

INVENTORS
CARL E. JOHNSON
EARL MENDENHALL
BY
ATTORNEY.

April 9, 1940. C. E. JOHNSON ET AL 2,196,605
VARIABLE SPEED DEVICE HAVING TWO MOVABLE FLANGES
Filed July 9, 1935 4 Sheets-Sheet 2
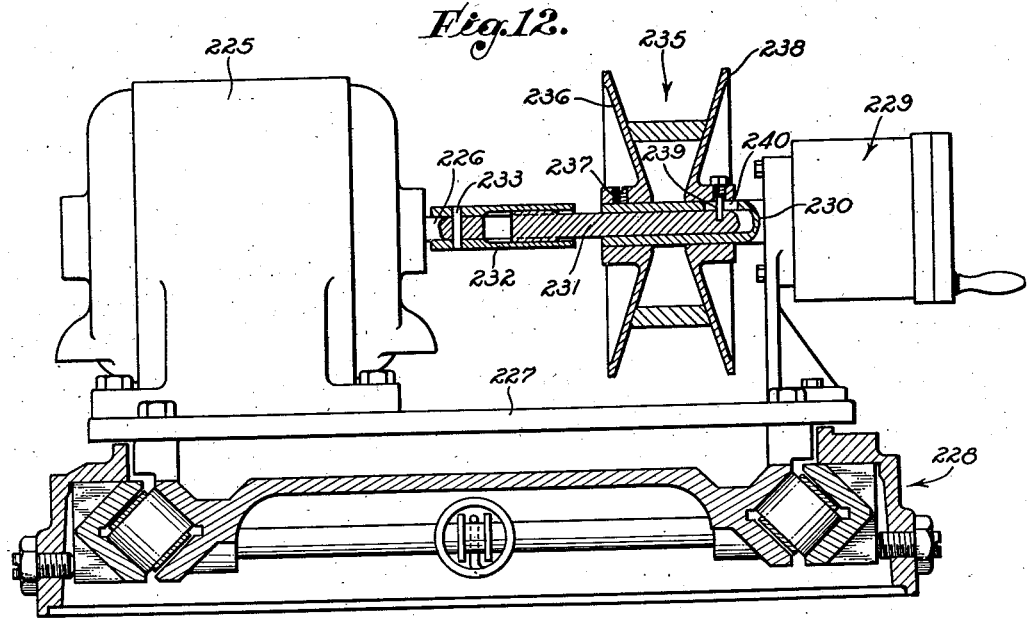
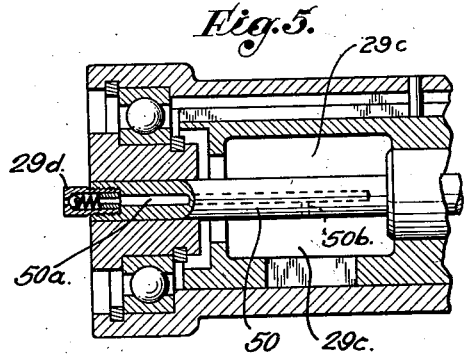
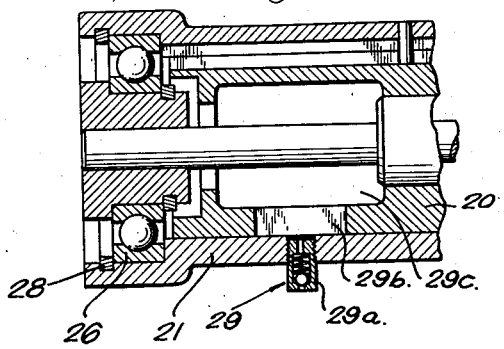
INVENTORS
CARL E. JOHNSON
EARL MENDENHALL
BY
ATTORNEY.

INVENTORS
CARL E. JOHNSON
EARL MENDENHALL
BY
ATTORNEY.

April 9, 1940.   C. E. JOHNSON ET AL   2,196,605
VARIABLE SPEED DEVICE HAVING TWO MOVABLE FLANGES
Filed July 9, 1935   4 Sheets-Sheet 4
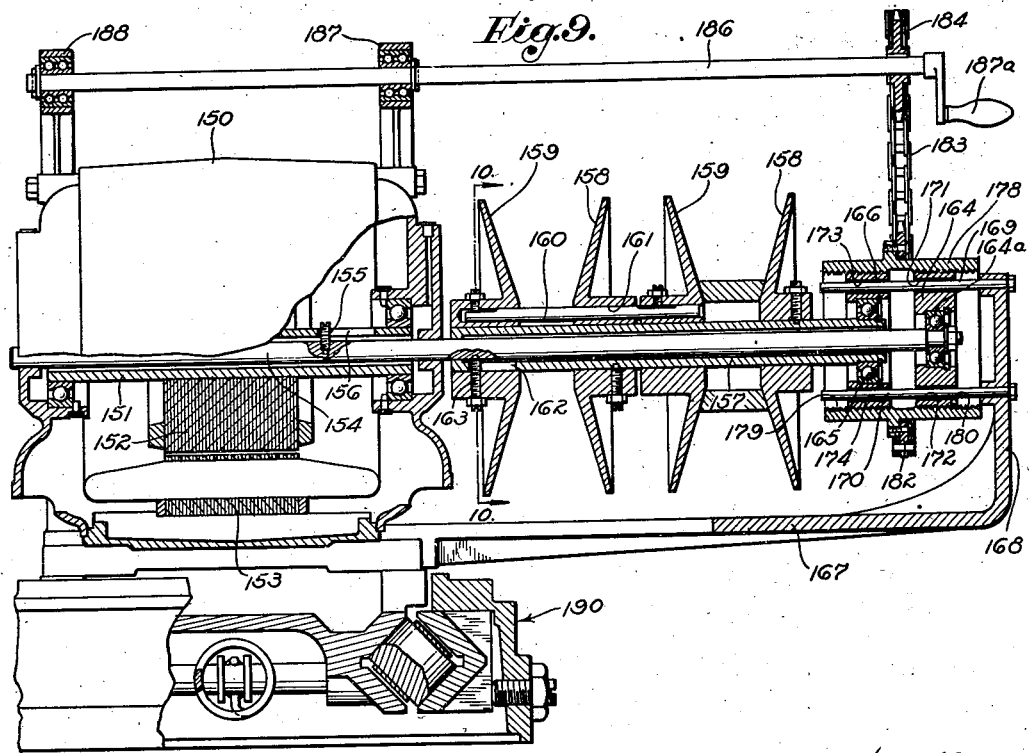
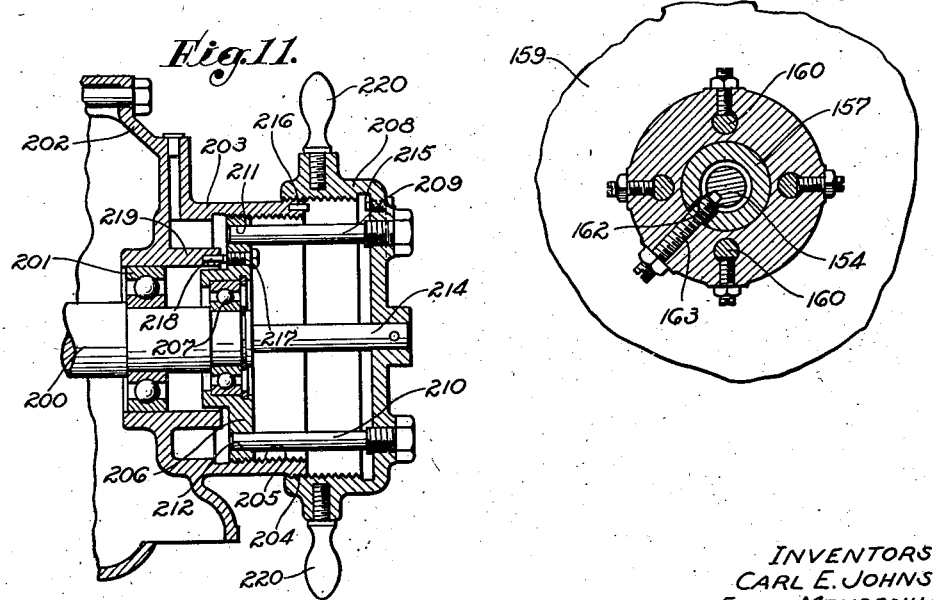
INVENTORS
CARL E. JOHNSON
EARL MENDENHALL
BY
ATTORNEY.

Patented Apr. 9, 1940

2,196,605

UNITED STATES PATENT OFFICE

2,196,605

VARIABLE-SPEED DEVICE HAVING TWO MOVABLE FLANGES

Carl E. Johnson, Pasadena, and Earl Mendenhall, Los Angeles, Calif., assignors to Sterling Electric Motors, Inc., Los Angeles, Calif., a corporation of California Application July 9, 1935, Serial No. 30,506

6 Claims. (Cl. 74—230.17)

Our invention relates to variable-speed transmission devices, and more particularly to a variable-speed system adapted to change the speed ratio between a drive shaft and a driven shaft.

The invention is applicable to various types of variable-speed systems, but in the preferred embodiment we prefer to utilize the type of variable-speed unit including a V-belt or its equivalent in conjunction with one or more variable-diameter pulley means, preferably of the type including a pair of flange members which can be moved toward and away from each other to change the effective diameter of the pulley means.

In existing structures it is common to use a variable-diameter pulley on the drive shaft of a motor and a fixed-diameter pulley on a driven shaft connected to the variable-diameter pulley by a V-belt, and in such systems the variable-diameter pulley is comprised of a conical flange fixed to the drive shaft and a conical flange movable axially on the drive shaft. Where such a variable-diameter pulley having an axially fixed and an axially movable flange is used, it is discovered that when the diameter of the pulley is changed by varying the axial position of the movable flange relative to the fixed flange, the belt will not remain in the same plane due to the fact that the center of the pulley shifts axially with its change in effective diameter. This results in the belt creeping up on the flange adjacent the plane in which the belt would be perpendicular to the drive shaft, with consequent serious wear on the belt and inefficient operation of the device. To obviate these disadvantages, various systems have been devised in which the drive shaft is moved axially a distance proportionate to the change in effective diameter of the variable-diameter pulley, so as to maintain the belt at all times perpendicular to the drive shaft. Such systems necessarily require complicated structure, and it is a primary object of our invention to maintain the belt of a variable-speed transmission device in a plane substantially perpendicular to the shaft carrying the variable-diameter pulley without moving the pulley shaft axially as has heretofore been necessary. We prefer to accomplish this object by providing a variable-diameter pulley means having two movable flanges, each of which is axially movable toward and away from the other.

It is a further object of our device to provide a variable-diameter pulley means including two axially movable flange members, each of which is axially movable relative to the other, and adjustment means for positively moving the flange members axially so as to change the effective diameter of the pulley means. It is also an important object of our invention to provide mechanism in such a system to vary the effective diameter of the pulley means while the pulley means is rotating at any desired speed.

Another object of our invention is to supply adjustment means to vary the effective diameter of a variable-diameter pulley of the V-type, which adjustment means is operable from one side of the pulley means.

A still further object of our invention is to furnish a variable-speed system including a motor having a drive shaft, a variable-diameter pulley means of the V-type on said drive shaft at one side of the motor, the pulley means including a pair of conical flanges axially movable toward and away from each other, and adjustment means on the opposite side of the motor from the pulley means for positively moving the pulley flanges toward and away from each other to vary the effective diameter of the pulley means.

Another object of the invention lies in the provision of an adjustment means for a variable-diameter pulley of the V-type, including adjustable stops adapted to limit the axial movement of the flange members of the pulley means and to prevent overloading the bearings of the device.

Another object of the invention is to afford a motor having an axially movable drive shaft, there being a rotor fixed on the drive shaft which moves axially with the drive shaft and which is sufficiently longer than the stator of the motor to compensate for such axial movement of the rotor.

A further object of our invention is to provide a motor having an axially movable drive shaft and having a rotor fixed with relation to the stator of the motor, the motor being so constructed that the drive shaft can move axially relative to the rotor.

Another object of the invention is to furnish a plurality of variable-diameter pulleys of the V-type on a shaft, the pulleys each having two conical flanges movable toward and away from each other, and means for varying the effective diameters of said pulleys simultaneously.

In practice we have found that where a variable-speed pulley transmission system is used in conjunction with a base adapted to maintain a desired tension in the belt by relatively moving the drive and driven shafts, and sudden torque is applied to the variable-diameter pulley means, as for example, by rapid starting of rotation of the mechanism, or by some accident causing the pulley to jam, the belt-tensioning device will permit the variable-diameter pulley shaft to be jerked toward the other shaft with such force as to cause breakage of parts in the system. Accordingly, it is a further important object of our invention to furnish means for preventing starting or peak overloads on the belt-tensioning device. We prefer to accomplish this purpose by providing a snubber or dash-pot mechanism which will allow the drive and driven shafts to move relatively only at a slow rate of speed.

It is a still further object of our invention to supply a variable-speed pulley transmission including means for maintaining belt tension during changes of the speed ratio between the drive and driven shafts. We prefer to accomplish this by means of a base means adapted to support the motor of the unit, and to permit the drive shaft of the motor to be moved toward or away from the driven shaft as the effective diameter of the variable-diameter pulley is changed.

A further object of our invention is to provide a variable-speed transmission mechanism that can be adapted readily for use in conjunction with a standard type of electric motor or other power source.

Another object of our invention is to provide a variable-diameter pulley mechanism having a lubrication system adapted to suitably lubricate the moving parts of the mechanism, and particularly the sliding surfaces on the movable pulley flange members.

It is a further object of our invention to supply a novel base for a variable-speed pulley mechanism, which includes rollers operating in tracks.

A further object of our invention is to provide a variable-speed mechanism including a motor having the means for controlling the speed ratio of the mechanism externally supported on the housing of the motor.

Other objects and advantages of our invention reside in the particular structures disclosed, as well as in the general combinations, which will be evident from the following description and claims.

Referring to the drawings:

Fig. 4 is a detailed view of the lubricating means shown in Fig. 1.

Fig. 5 is an alternative form of lubricating means.

Fig. 9 is an elevational view, partially in section, of an alternative form of the invention.

Fig. 10 is an enlarged end view, partially in section, of the pulley means taken on the line 10—10 of Fig. 9.

Fig. 11 is an enlarged sectional view of an alternative form of adjustment means.

Fig. 12 is an elevational view, partially in section, of an alternative embodiment of the invention.

Figure 1:
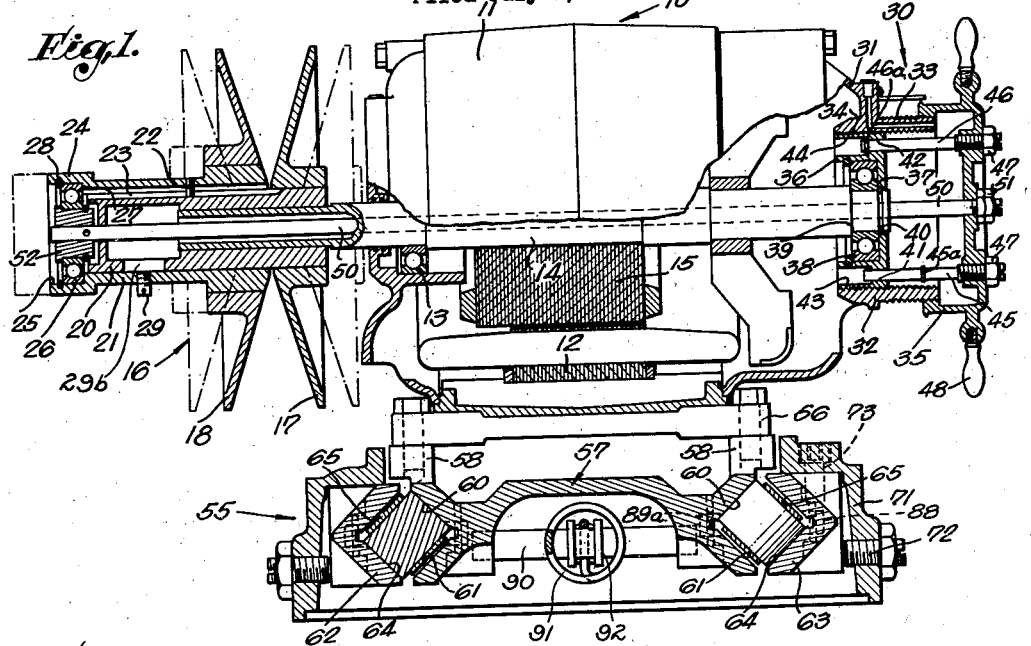
Fig. 1 is an elevational view partially in section, of one form of the invention.
Figure 2:
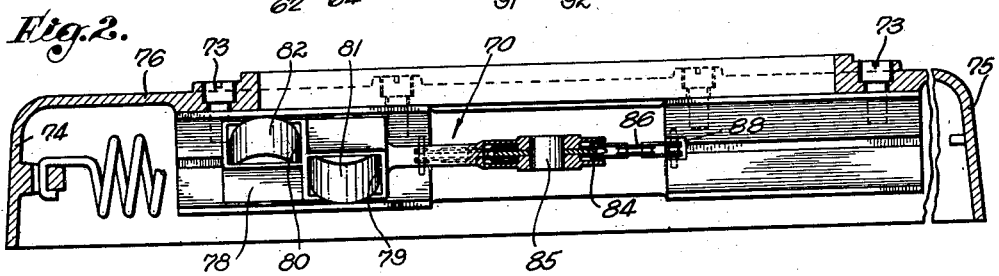
Fig. 2 is a sectional elevational view of the base means shown in Fig. 1.
Figure 3:
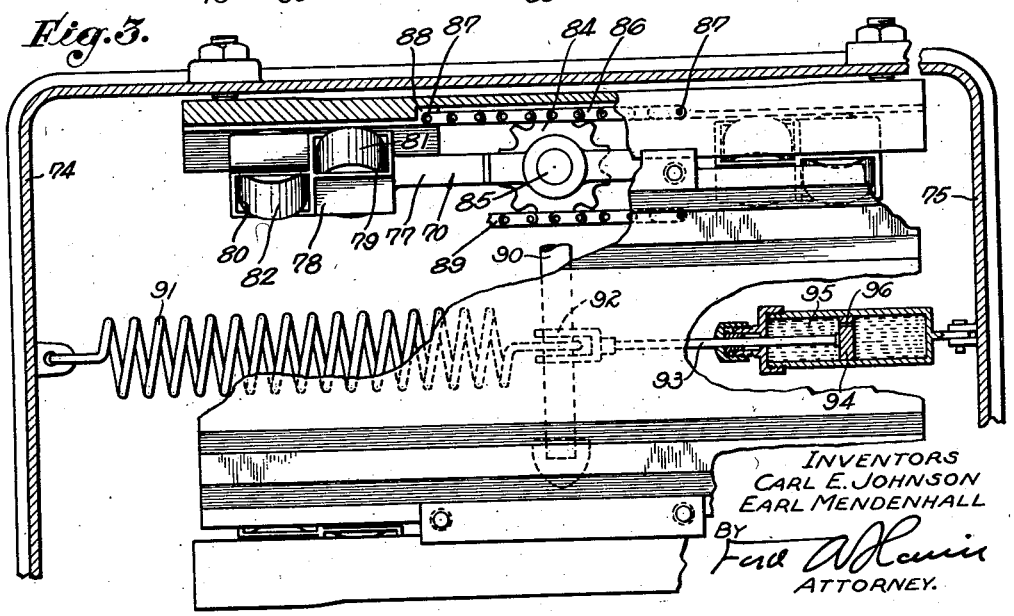
Fig. 3 is a plan view, partially in section, of the base means of our invention shown in Figs. 1 and 2.

Referring to Fig. 1, we show a motor 10 having a housing 11 and a stator 12 fixed therein. The housing 11 provides bearing means 13 at one end thereof for journaling a motor shaft 14 carrying a rotor 15 fixed thereto by any suitable means.

The motor shaft 14 extends beyond the housing 11 at one end thereof and carries pulley means 16 of the variable-diameter V-type. The pulley means 16 has a pair of axially movable flange members 17 and 18 providing opposed inclined faces adapted to receive a V-belt which may be connected to a device to be driven similarly to the embodiment shown in Fig. 4 and described hereinafter. An inner sleeve member 20 is provided which is fixed on the motor shaft 14 or formed integrally therewith and on which is fixed the inner flange member 17. Journaled on the inner sleeve member 20 is an outer sleeve member 21 to which is suitably fixed the outer flange member 18. The outer sleeve member 21 is provided with a key-pin 22 which extends into a keyway 23 in the inner sleeve member 20 so that the sleeve members may move axially relative to each other but will rotate together. The outer end of the outer sleeve member 21 is provided with an enlarged portion 24 having an annular recess 25 therein adapted to receive bearing means 26 which may be in the form of a ball bearing structure having outer and inner races, the outer race abutting against a shoulder 27 in the outer sleeve member 21 and being held in fixed position relative to the sleeve member by a snap ring 28 which fits into a suitable channel in the recess 25.

The pulley means 16 is adapted to be lubricated by a lubricating means 29, shown in detail in Fig. 4, which includes a ball-valve 29a carried by the outer sleeve member 21 and communicating through a longitudinal slot 29b in the inner sleeve member 20 with a lubricant reservoir 29c in the interior of the inner sleeve. Lubricant may be forced under pressure through the ball-valve 29a into the reservoir 29c, which lubricant, when the device is rotated, is forced outwardly by centrifugal force between the outer and inner sleeves 21 and 20 to lubricate the engaging surfaces of the sleeves. Lubricant will also pass between the sleeves 20 and 21 into the bearings 26 to keep them properly lubricated. An alternative form of lubricating means is shown in Fig. 5, in which a ball-valve 29d is fixed in the end of a rod 50 and communicates through a central bore 50a and openings 50b with the oil reservoir 29c. The operation of the lubricating means shown in Fig. 5 is substantially similar to that shown in Fig. 4, except that lubricant is forced through the end of the rod 50 instead of through the sleeves 20 and 21.

At the other end of the housing 11 from the pulley means 16, an adjustment means 30 is provided which is adapted to move the flange members 17 and 18 axially, as will be described hereinafter. The end portion 31 of the housing 11 is provided with an annular projection 32 having external left-hand threads 33 and internal right-hand threads 34, the external threads 33 being adapted to receive an internally threaded actuating member 35, and the internal threads 34 being adapted to receive an externally threaded actuating element 36. The actuating element 36 has an annular shoulder 37 adapted to engage a bearing 38 which is held on the motor shaft 14 against a shoulder 39 thereon by a suitable snap ring 40 set in an annular channel in the motor shaft. The actuating element 36 has openings 41 and 42 therein which have enlarged portions 43 and 44 respectively, the openings being adapted to slidably receive pin members 45 and 46 threadedly secured to the actuating member 35 by means of nuts 47. The inner end of the pin member 46 is provided with a suitable snap ring 46a which engages the actuating element 36 to limit the inward movement of the actuating element 36 relative to the pin members, and the pin member 45 is provided with a suitable snap ring 45a which engages the outer side of the annular shoulder 37 to limit the outward movement of the actuating element 36. The pin members 45 and 46 also serve to limit the inward and outward movement of the actuating member 35. In practice it may be found desirable to use more than two pin members similar to the pin members 45 and 46, and we do not intend to be limited by our disclosure in the number of such pin members used. It is to be noted that by tightening or loosening the nuts 47, the length of the pin members 45 and 46 can be varied, providing a convenient adjustable stop means to limit the inward movement of the actuating means 36 so as to prevent overloading of the bearing 38, and this is an important feature of the invention. The actuating member 35 is provided with a plurality of handles 48 by which the actuating means may be conveniently rotated.

A rod member 50 extends through the motor shaft 14, being axially aligned therein and spaced from the internal surface of the motor shaft. One end of the rod member 50 is rigidly connected to the actuating member 35 by any suitable means such as lock nuts 51 threaded thereon, the other end of the rod member being rigidly connected to a head element 52 which journals the inner race of the bearing means 26, the inner race of the bearing being held in engagement with a shoulder on the head element by a suitable snap ring.

It will be seen that when the actuating member 35 is rotated in a clockwise direction, the internal threads thereon will cooperate with the external left-hand threads 33 on the projection 32 to cause the actuating member to travel outwardly on the projection, and the rod 50 will move axially to the right, as seen in Fig. 1, so as to cause the head element 52 to force the bearing 26 to the right, and consequently the flange 18 will slide to the right with the outer sleeve 21. Such rotation of the actuating member 35 will also cause a rotation therewith of the actuating element 36 through the pin members 45 and 46, and due to the cooperation of the external threads on the actuating element and the internal right-hand threads 34 on the projection 32, the actuating means will move to the left on the pin members 45 and 46. Movement of the actuating element 36 will cause a corresponding axial movement of the motor shaft 14, since the bearings 38 are fixed thereto, and when the actuating element is moved to the left as described, the motor shaft 14 will move to the left and carry with it the flange member 17 secured thereto by the inner sleeve 20. Thus, when the actuating member 35 is rotated in a clockwise direction by means of the handles 48, the flange members 17 and 18 will move simultaneously axially together, and when the actuating means is moved in a counter-clockwise direction, the flange members will simultaneously move away from each other so as to provide any desired effective diameter for the variable-diameter pulley means 16. As the flange members 17 and 18 are moved together or apart, the belt received therein will move inwardly or outwardly from the center of the pulley, depending upon the direction of movement of the flange members, to change the speed ratio of the pulley means 16.

The motor 10 is supported on a base means 55 so as to be movable thereon at an angle to a plane in which the motor shaft 14 lies. The motor 10 is provided with a base 56 which may be of any suitable design and which is adapted to be secured to a carriage member 57 by bolts or otherwise. The carriage member 57 has side rails 58 and a sunken central portion 59, the side rails 58 providing recessed tracks 60 and 61 formed at right angles to each other in the side rails. Cooperating track members 62 and 63 having recessed track portions 64 and 65 cooperate with the recessed tracks 60 and 61 to form track channels in which carrier members 70 may freely move, as will be described hereinafter. The cooperating track members 62 and 63 are held in fixed relative position in a base housing 71 by means of bolts 72 projecting through the sides thereof and bolts 73 projecting downwardly into the cooperating track members 62 and 63. The base housing 71 is provided with end portions 74 and 75 and has a top portion 76 which substantially closes the base means.

For convenience only one of the carrier members 70 will be described, it having a central spindle 77 having enlarged end portions 78 formed so as to provide rectangular openings 79 and 80 disposed at right angles to one another. Rollers 81 and 82 are carried in the openings 79 and 80, the openings and rollers being so disposed that the rollers 82 will engage the tracks 60 and 64 and so that the rollers 81 will engage the tracks 61 and 65. The weight of the carriage member 57 and the supported motor 10 on the rollers 81 and 82 will maintain the rollers in rolling relation in their respective tracks. The central spindle 77 is provided with a sprocket 84 rotatable on a hub 85 at the center thereof, the sprocket meshing with a chain 86 having its ends 87 suitably fastened to the cooperating track member 62 in a groove 88 by means of suitable pins. An inner chain 89 is provided in a suitable groove 89a in the side rails 58, having its ends fixed thereto by suitable pins, and it also meshes with the sprocket 84. Such a chain and sprocket system is supplied for each of the two carrier members 70 and provides means for substantially synchronizing and limiting the movement of the carrier members caused by movement of the carriage 57 thereon.

The carriage member 57 is provided with a transverse bar 90 to which is secured one end of a large coil spring 91 having its other end secured to the end portion 74 of the base housing 71. The spring 91 is disposed oppositely to the direction of the belt connecting the variable-diameter pulley means 16 with the device to be driven so as to maintain a desired degree of tension in the belt, the carriage 57 being freely movable on the carrier 70. Also connected to the transverse bar 90 is a yoke 92 having a plunger rod 93 fixed thereto which carries a piston 94 adapted to slide in a piston chamber 95 connected to the end portion 75 of the base housing 71 by any suitable means. The piston chamber 95 is filled with a suitable fluid, such as glycerine, and the piston 94 is provided with a small opening 96 which communicates with both sides of the piston so as to permit the fluid to be forced from one side of the piston to the other upon longitudinal movement of the plunger rod 93 and the piston. Since fluid can be forced through the opening 96 only at a slow rate, this piston mechanism provides means for preventing rapid movement of the carriage 57 relative to the base housing 71 and consequently prevents rapid movement of the motor shaft 14 relative to a driven shaft on a device to be driven so as to compensate for peak overloads and rapid starting or stopping of the pulley system, thus preventing breakage in the device.

Figure 7:
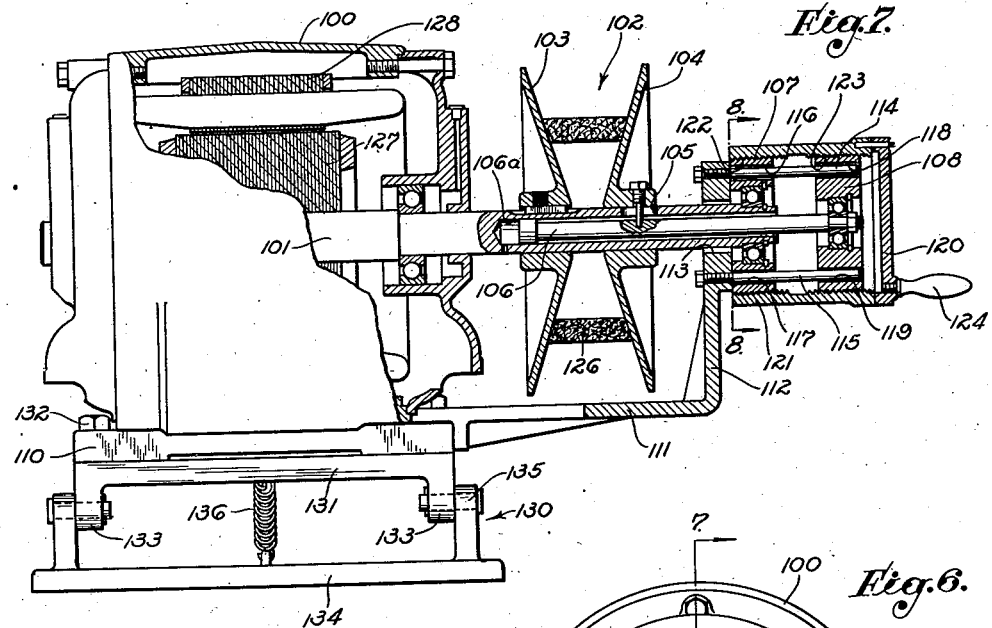
Fig. 7 is a sectional view taken on the line 7—7 of Fig. 6.
Figure 6:
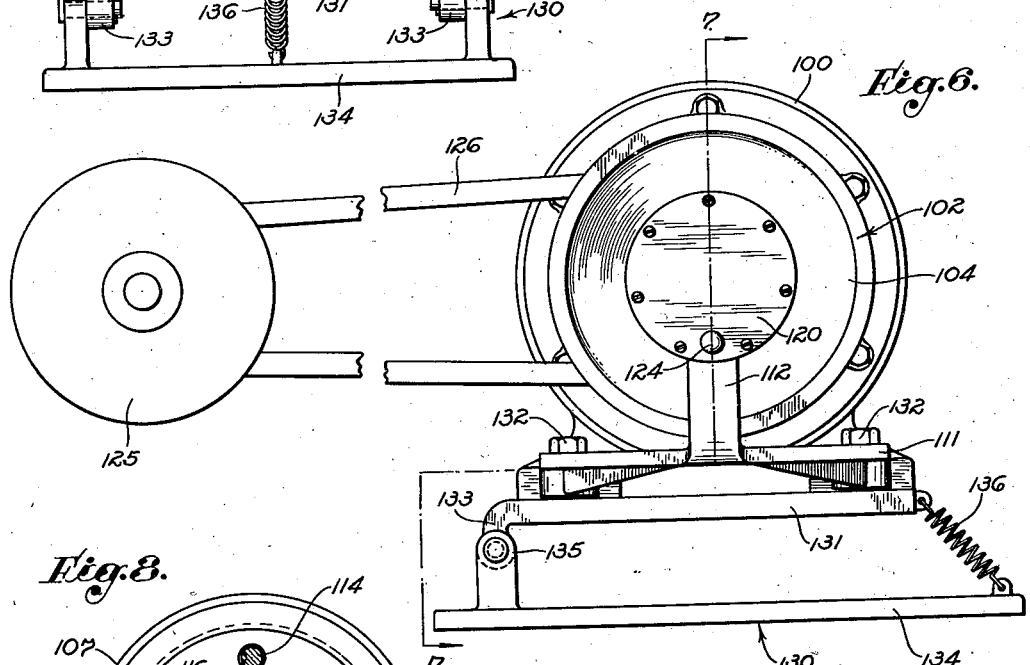
Fig. 6 is an elevational view of an alternative embodiment of the invention.
Figure 8:
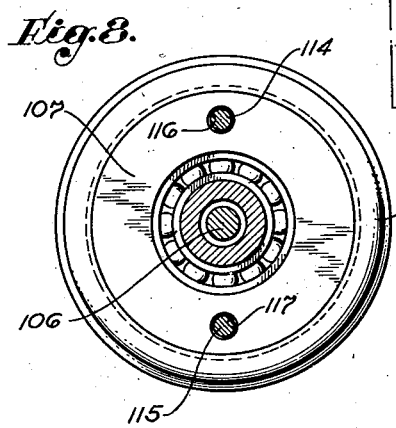
Fig. 8 is an enlarged sectional view taken on the line 8—8 of Fig. 7.

An alternate embodiment of our invention is shown in Figs. 6, 7, and 8, in which the adjustment mechanism is adapted to be placed on the same side of the motor as the variable-diameter V-type pulley which is of importance in some installations where space requirements necessitate one side of the motor being placed adjacent an article of machinery. In this embodiment we prefer to use a standard form of motor 100 having a motor shaft 101 journaled in the motor housing by suitable bearing means adapted to permit axial movement of the motor shaft. As shown in Fig. 7, the right end of the motor shaft 101 carries variable-diameter pulley means 102 of the V-type having flange members 103 and 104, the flange member 103 being keyed to the motor shaft so as to be fixed relative thereto and the flange 104 being rotatable with the motor shaft but slidable thereon, the flange 104 having a pin which extends through a longitudinal slot 105 in the motor shaft 101 and into a rod member 106 which extends into a counter-bored portion 106a of the motor shaft. The outer end of the motor shaft 101 is connected through suitable thrust bearings to an externally threaded riding member 107 having left-hand threads, and the rod member 106 is connected at its outer end through suitable thrust bearings to a riding element 108 having external right-hand threads.

The motor 100 has a base 110 provided with an arm 111 having an upwardly extending portion 112 provided with a central opening 113 through which the motor shaft 101 and the rod member 106 pass. Pins 114 and 115 are secured to the upwardly extending portion 112 of the arm 111 and extend outwardly therefrom, being adapted to pass through openings 116 and 117 respectively in the riding member 107 and through openings 118 and 119 in the riding element 108, all of said openings having an internal diameter slightly greater than the external diameter of the pins 114 and 115 to permit the riding member and the riding element to move axially relative to the pins. An actuating element 120 is provided in the form of a cup-shaped member having a cylindrical wall 121 provided with internal left-hand threads 122 and internal right-hand threads 123 adapted to cooperate with the external threads of the riding member 107 and the riding element 108 respectively. A handle 124 is suitably secured to the actuating element 120 to provide a convenient means for rotating the actuating element.

When the actuating element 120 is rotated in a clockwise direction, the internal threads 122 cooperate with the external threads on the riding member 107 to cause the riding member to move axially to the right on the pins 114 and 115, and the internal threads 123 will cooperate with the external threads on the riding element 108 to cause the riding element to move axially to the left, the movements of the riding member and the riding element being equal and simultaneous. As a consequence of the movement of the riding member 107 and the riding element 108 on the pins 114 and 115, the motor shaft 101 will be moved axially to the right, and the rod member 106 will be moved axially to the left so as to decrease the effective diameter of the variable-diameter pulley means 102, the flanges 103 and 104 moving with the motor shaft and rod. A counter-clockwise rotation of the actuating element 120, conversely, will cause the flanges 103 and 104 to separate to increase the effective diameter of the pulley means 102. The variable-diameter pulley means 102 is connected to a driven pulley 125 by means of a belt 126, and the speed relation between the variable-diameter pulley and the driven pulley may be varied by axially moving the flanges 103 and 104 relative to each other. In this embodiment, as in the embodiment shown in Fig. 1, the rotor 127 is fixed to the motor shaft 101 and is sufficiently longer than the stator 128 so that when the rotor is moved axially with the motor shaft, the electrical characteristics of the motor will not be changed, which is a further important feature of the invention. Likewise, as in Fig. 1, stop means is provided to prevent overloading of the bearings, the riding member 107 in its extreme leftward position engaging the portion 112 of the arm 111, and in its extreme rightward position engaging the riding element 108.

The motor 100 is carried by a base mechanism 130 consisting of an L-shaped platform 131 to which the motor base 110 is secured by bolts 132 or other suitable means, and which has a downwardly depending projection 133 at each side thereof, each of which is pivoted to a sub-base 134 by suitable means such as the hubs 135. A coil spring 136 is connected between the end of the platform 131 and the sub-base 134 and as part of the base acts as a belt-tensioning device to maintain the desired degree of tension in the belt 126 at all times, similarly to the base means 55 of Fig. 1. It is to be understood, however, that in some installations the spring 136 can be dispensed with, since the weight of the motor 100, being pivoted on the hubs 135, will act as a belt-tensioning means.

An alternative form of our device is shown in Figs. 9 and 10, in which we prefer to use a plurality of variable-diameter pulleys instead of the single pulley shown in the above described embodiments. In Fig. 9 a standard form of motor 150 is provided having a hollow motor shaft 151 suitably journaled therein in bearings, the shaft carrying a rotor 152 of substantially the same length as the stator 153 fixed in the motor housing. The ends of the motor housing provide journaling means for an axially movable rod 154 which extends through the hollow motor shaft 151 and a considerable distance beyond one end of the motor. The rod 154 is keyed to the motor shaft 151 by means of a key 155 which extends through a longitudinal slot 156 in the motor shaft so as to permit the rod to move axially relative to the motor shaft but causing it to rotate therewith. Fixed to the rod 154 so as to rotate therewith is a sleeve member 157 which carries thereon a plurality of flange members 158 suitably fastened to the sleeve or formed integrally therewith. Slidably disposed on the sleeve member 157 are a plurality of opposed flange members 159 fastened together by means of a pin 160 fixed to each of the flange members 159 by appropriate means and passing through an opening 161 in one of the flange members 158. A slot 162 is provided in the sleeve member 157, and a pin 163 passes through one of the flange members 159 and through the slot 162 and is keyed to the axially movable rod 154 so as to rigidly connect the flange members 159 to the axially movable rod. The slot 162 permits the flange members 158 to move axially with the rod 154 relative to the flange members 158 on the sleeve 157 but causes all of the flange members to rotate in unison.

The end of the rod 154 is connected through appropriate bearings 164a to an outer rider member 164 having external right-hand threads, and the sleeve member 157 is connected through bearings 165 to an inner rider member 166 having external left-hand threads. Fixed to the base of the motor 150 is an outwardly extending arm 167 having a vertical portion 168 to which rods 169 and 170 are rigidly secured so as to pass through openings 171 and 172 in the outer rider member 164 and openings 173 and 174 in the inner rider member 166 to prevent the rider members from rotating relative to each other but permitting the rider members to move axially relative to each other. An actuating element 178 provides a cylindrical wall having internal left-hand threads 179 adapted to cooperate with the external threads on the inner rider member 166 and having internal right-hand threads 180 adapted to cooperate with the external right-hand threads on the outer rider member 164. A sprocket 182 is fixed on the actuating element 178 or may be formed integral therewith which engages a chain 183 carried on an operating sprocket 184, the operating sprocket being fixed to an actuating rod 186 journaled in bearing supports 187 and 188 which are suitably fastened to the housing of the motor 150 or formed integrally therewith. The actuating rod 186 is provided with handle means 187a which may be used to rotate the rod and sprocket 184 and consequently the sprocket 182 through the chain 183.

When the sprocket 182 is rotated in a clockwise direction, the threads on the actuating element 178 will cause the inner and outer rider members 164 and 166 to move simultaneously toward each other, which in turn will cause the sleeve member 157 and the rod 154 to move likewise so as to simultaneously vary the relative spacing of the flange members 158 and 159 of each of the pulleys to decrease the effective pulley diameters. A counter-clockwise rotation of the actuating element 178, conversely, increases the effective pulley diameters.

The motor 150 is supported by a base mechanism 190 substantially the same as the base means 55 shown in Fig. 1 and for the same purpose. A primary advantage of the embodiment shown in Fig. 9 lies in the fact that a plurality of variable-diameter pulleys may be utilized in connection with cooperating belts leading to a pulley structure to be driven, which finds particular utility where a heavy motor installation is required, since it permits smaller and more flexible belts to be used than would otherwise be possible and provides mechanism which can transmit the high torque developed by a powerful motor without slipping or damaging the belts.

In Fig. 11 we show an alternative form of adjustment means for changing the effective diameter of a variable-diameter pulley as above described, which may be substituted for the adjustment means illustrated in Fig. 1. In this form of the invention, a hollow motor shaft 200 is suitably journaled in bearings 201 in a motor housing 202 and has one end operatively connected to one flange of a variable-diameter pulley. The motor housing 202 has an annular wall 203 provided with external right-hand threads 204 and internal left-hand threads 205. The internal threads 205 receive an externally threaded riding element 206 which is connected through bearings 207 to the motor shaft 200 so as to move axially therewith, and the external threads 204 receive an internally threaded cup-shaped actuating element 208. The actuating element 208 is supplied with pins 209 and 210 which extend through openings 211 and 212 respectively in the riding element 206, the pins being slidable in the openings but causing the riding element to rotate with the actuating element. The actuating element is rigidly connected to a rod 214 which extends through the hollow motor shaft 200 and is in turn operatively connected to the other flange of the variable-diameter pulley which is to be adjusted. A set screw 215 carried by the actuating element 208 is adapted to engage a pin 216 set in the annular wall 203 of the housing 202 to limit inward movement of the actuating element, and provides a readily adjustable stopping means for the adjustment mechanism. A set screw 217 is carried by the riding element 206 and is adapted to engage a stop pin 218 set in a projecting wall 219 of the motor housing 202 to limit inward movement of the riding element, and also provides a readily adjustable stopping means for the mechanism. Handles 220 are carried on the actuating element 208 and provide convenient means for rotating the actuating element.

When the actuating element 208 is rotated in a clockwise direction, the riding element 206 being similarly rotated by the pins 209 and 210, the external threads 204 of the wall 203 will cooperate with the internal threads on the actuating element to cause the actuating element to travel inwardly relative to the motor housing 202 until the set screw 215 engages the pin 216 to prevent farther rotation of the actuating element. Similarly, with a clockwise rotation of the actuating element, the riding element 206 will rotate in the same direction, and the internal threads 205 on the wall 203 will cooperate with the external threads on the riding element to cause the actuating element to travel outwardly relative to the housing 202. A counter-clockwise rotation of the actuating element 208 will cause the actuating element to travel outwardly and the riding element to travel inwardly until the set screw 217 engages the pin 218 to prevent farther rotation of the elements. Axial movement of the actuating element 208 and the riding element 206 is, of course, communicated through the rod 214 and the motor shaft 200 to the flanges of the pulley so as to change the effective diameter thereof.

In Fig. 12 is shown another embodiment of the invention in which a variable-diameter pulley structure, together with a belt-tensioning base, is connected to an ordinary solid shaft motor to convert the motor into a variable-speed unit. In this form of the invention a standard motor 225, having a solid motor shaft 226, is supported on an auxiliary base 227 carried by a base means 228 similar to the base shown in Fig. 1. An adjustment means 229 is carried by the base 228 and may be of any desired construction, such as, for example, the adjustment means shown in Fig. 7, and is provided with a hollow shaft 230 projecting therefrom which journals a rod 231 extending through the hollow shaft. The rod 231 is splined in a sleeve 232 which is fixed to the motor shaft 226 by any suitable means, such as a pin 233, so as to permit the rod to be moved axially relative to the motor shaft but to cause it to rotate therewith. A variable-diameter pulley 235 is carried on the hollow shaft 230 and has a flange 236 fixed to the hollow shaft 230 by a pin 237, and a flange 238 fixed to the rod 231 by a key 239 which extends through a longitudinal slot 240 in the hollow shaft. Axial movement of the hollow shaft 230 and the rod 231, produced by the adjustment means 229 as described above in connection with Fig. 7, will cause an axial relative movement of the flanges 236 and 238 to vary the effective diameter of the pulley 235. A primary advantage of this form of the invention lies in the fact that a standard form of motor can be converted readily into a variable-speed unit without providing a special motor shaft.

It is to be understood that the different forms of base means may be interchanged in the embodiments shown without departing from the spirit of our invention or that other belt-tensioning means may be used as a substitute therefor without materially changing the scope of our invention. It is also to be understood that although we have shown the rotor 152 and the stator 153 in Fig. 9 to be of the same length, the rotor being carried on the motor shaft, an auxiliary rotor shaft similar to the motor shaft 151 may be provided in either of the embodiments shown in Figs. 1, 7, or 12 so as to prevent the rotors therein from moving axially, without departing from the spirit of our invention. Furthermore, it is to be understood that the multiple-belt pulley shown in Fig. 9 may be used in connection with the adjustment means illustrated in the other embodiments without departing from our invention. Other interchanges of parts between the various embodiments shown will be obvious to one skilled in the art, and we do not intend to be limited to the specific structure illustrated and described.

We claim as our invention:

1. In combination: a motor housing; stator means within said housing; bearings at each end of said housing and axially movable therein; a motor shaft journalled in said bearings and axially movable; rotor means carried by said shaft and fixed thereto, said rotor means having a length substantially greater than the length of said stator means so that an axial movement of said rotor means relative to said stator means will not affect the characteristics of said motor; a variable-diameter pulley of the V-type on said shaft, said pulley having two flanges one of which is fixed relative to said shaft and the other of which is axially movable on the shaft; and adjustment means for moving said shaft axially so as to move axially said fixed flange relative to said other flange to vary the effective diameter of said pulley.

2. In a variable-speed device, the combination of: a shaft; a variable-diameter pulley of the V-type on said shaft, said pulley having two flanges both axially movable toward and away from each other; a tubular element having internal right-hand and left-hand threaded portions; a first member disposed within said tubular element and threadedly engaging said right-hand threaded portion; means operatively connecting said first member to one of said flanges; a second member disposed within said tubular element and threadedly engaging said left-hand threaded portion; means operatively connecting said second member to the other of said flanges; means for preventing relative rotation of said members; and means for rotating said tubular element so as to move said members axially to move said flanges toward or away from each other so as to vary the effective diameter of said pulley.

3. In a variable-speed device, the combination of: a shaft; a variable-diameter pulley of the V-type on said shaft, said pulley having two flanges both axially movable toward and away from each other; a tubular element having right-hand and left-hand threaded portions, said element being axially aligned with said shaft; a first member threadedly engaging said right-hand threaded portion of said tubular element; means operatively connecting said first member to one of said flanges; a second member threadedly engaging said left-hand threaded portion of said tubular element; means operatively connecting said second member to the other of said flanges; and means for causing relative rotation between said members and said element to cause said members to move axially to adjust the relative axial position of said flanges to vary the effective diameter of said pulley.

4. In combination: a motor housing; stator means within said housing; bearings at each end of said housing and axially movable therein; a motor shaft journalled in said bearings and axially movable; rotor means carried by said shaft and fixed thereto, said rotor means having a length substantially greater than the length of said stator means so that an axial movement of said rotor means relative to said stator means will not affect the characteristics of said motor; a variable-diameter pulley of the V-type on said shaft, said pulley having two flanges, one of which is fixed relative to said shaft and the other of which is axially movable on the shaft; and adjustment means for moving said shaft axially so as to move axially said fixed flange relative to said other flange to vary the effective diameter of said pulley, said adjustment means including a rotatable threaded element, a threaded member engaging said threaded element, thrust-bearing means operatively connecting said threaded member and said shaft, and means for rotating said threaded element to move said threaded member axially.

5. In combination: a motor housing; stator means within said housing; bearings at each end of said housing and axially movable therein; a motor shaft journalled in said bearings and axially movable; rotor means carried by said shaft and fixed thereto, said rotor means having a length substantially greater than the length of said stator means so that an axial movement of said rotor means relative to said stator means will not affect the characteristics of said motor; a variable-diameter pulley of the V-type on said shaft, said pulley having two flanges, one of which is fixed relative to said shaft and the other of which is axially movable on the shaft; and adjustment means for moving said shaft and said other pulley flange axially in equal amounts and in opposite directions so as to move axially said fixed flange relative to said other flange to vary the effective diameter of said pulley.

6. In combination: a motor housing; stator means within said housing; bearings at each end of said housing and axially movable therein; a motor shaft journalled in said bearings and axially movable; rotor means carried by said shaft and fixed thereto, said rotor means having a length substantially greater than the length of said stator means so that an axial movement of said rotor means relative to said stator means will not affect the characteristics of said motor; a variable-diameter pulley of the V-type on said shaft, said pulley having two flanges, one of which is fixed relative to said shaft and the other of which is axially movable on the shaft; and adjustment means for moving said shaft and said other pulley flange axially in equal amounts and in opposite directions so as to move axially said fixed flange relative to said other flange to vary the effective diameter of said pulley, said adjustment means including a tubular element having right-hand and left-hand threaded portions, a first member threadedly engaging said right-hand threaded portion of said tubular element and operatively connected to said shaft, a second member threadedly engaging said left-hand threaded portion of said tubular element and operatively connected to said other flange, and means for causing relative rotation between said members and said element to cause said members to move axially in equal amounts and in opposite directions.

CARL E. JOHNSON.
EARL MENDENHALL.